Oct. 29, 1957    M. DONOVAN    2,811,281
DISPENSING CONTAINER FOR FLOWABLE MATERIAL
Filed Jan. 18, 1955    2 Sheets-Sheet 1

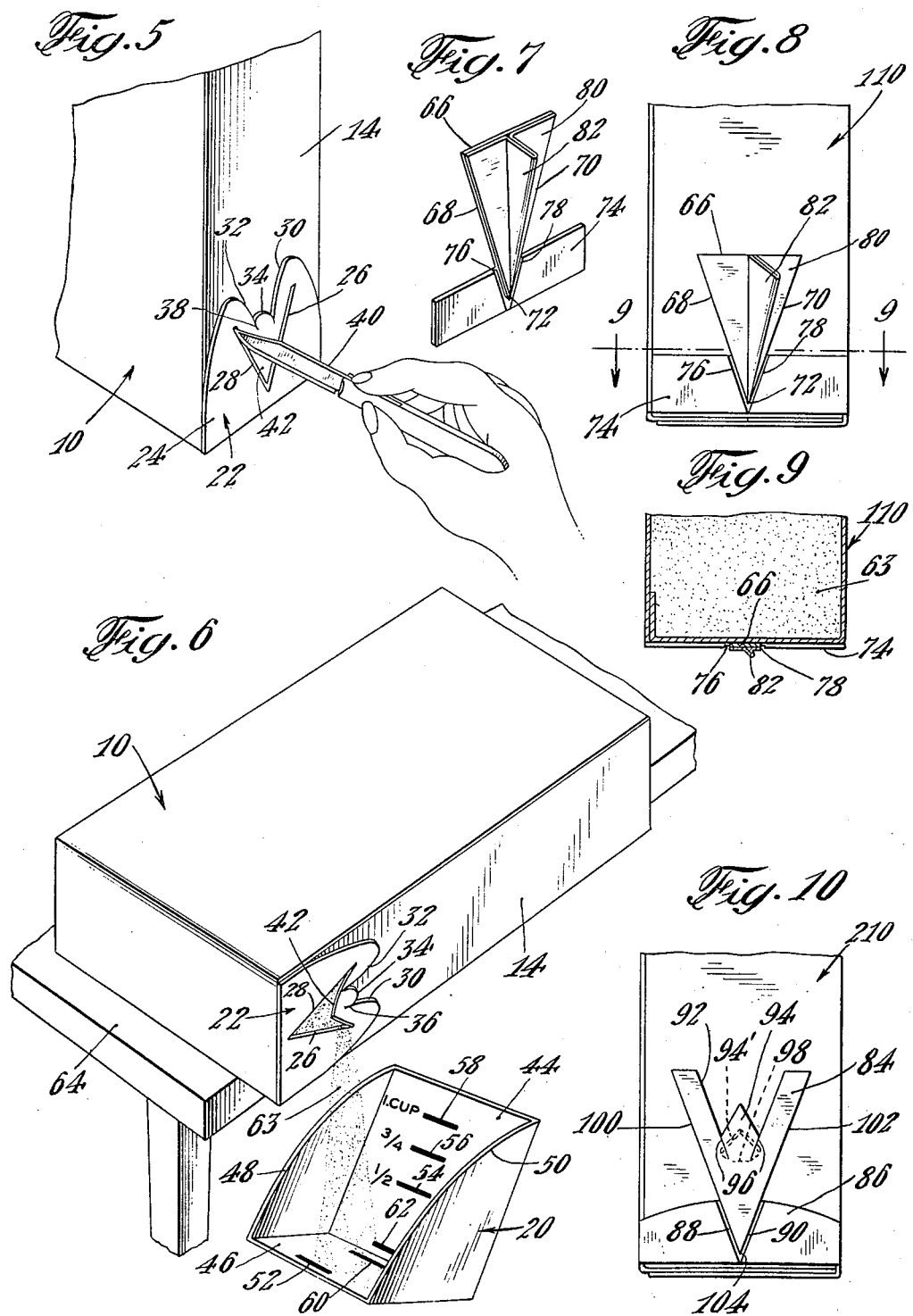

United States Patent Office 2,811,281
Patented Oct. 29, 1957

2,811,281
DISPENSING CONTAINER FOR FLOWABLE MATERIAL

Marion Donovan, Saugatuck, Conn.

Application January 18, 1955, Serial No. 482,503

4 Claims. (Cl. 222—81)

The present invention relates to a container having dispensing means for use with flowable materials and which includes a detachable device for accurate and convenient measuring of material dispensed from the container. It is contemplated that the container incorporating the dispensing device and with the measuring device detachably assembled therewith will be filled with a dispensable material whereby to constitute a package.

The present invention is well adapted for use with a wide variety of flowable dry materials including freely flowable materials and for use with the relatively small packages with which dispensing devices are commonly used. However, it is particularly adapted for use with various dry materials of a granular or very dense nature which are not particularly free flowing and for any flowable materials which are customarily sold in relatively large and heavy packages. It is an object of the present invention to provide a package with dispensing and measuring features adapted for small or large packages and for a wide variety of flowable materials.

Pouring spouts useful with relatively light, fluffy, flowable materials sold in relatively small packages may be very simple in construction. For example, they may be formed in an ordinary paperboard box as lines of weakening or incomplete perforations which are not likely to be inadvertently ruptured because the small boxes are relatively stiff and because of the relatively light weight and density of the contents. Breaking of the lines of weakening or perforation by the consumer will result in the formation of a spout of movable flap or the like through which the material may be dispensed. For denser products, such as salt and sugar, for example, the commercially successful pouring spouts or dispensing device of necessity have been more complicated or expensive because of the much greater likelihood of sifting or of inadvertent opening of the package during handling and shipping. Still other materials which are dense and not particularly free flowing have not been customarily sold in dispensing packages because relatively large dispensing openings must be provided and the strain placed thereon by the weight of the heavy product is almost certain to cause rupture of any of the inexpensive and simple forms of dispensing structure heretofore available. Also products which are customarily sold in fairly large quantities, say of 10 to 25 pounds, have not been generally packaged in dispensing containers. This is partly because weakening of the walls of heavy packages is unwise and further because the heavy packages are difficult for the customer to lift. Accordingly, any attempt to pour a relatively small quantity of material from such a large container into a measuring cup or other relatively small receiver is a difficult and awkward procedure. The present invention affords an extremely simple and inexpensive dispensing feature which may be applied to all sorts of containers for all sorts of materials of generally flowable nature and which does not weaken the container in any respect prior to deliberate opening of the dispensing device. Also, the dispensing device of the present invention is so positioned upon the container that a very large percentage of the contents thereof may be dispensed from the container without any necessity for lifting the same from the shelf or other support on which the consumer may place it. Another feature of the present invention resides in the provision of a detachable measuring cup adapted to telescope over a corner of the container, preferably in a position overlying the dispensing device. The measuring cup therefore may serve the purpose of assisting in closing the dispensing opening once it has been deliberately opened by the consumer as well as serving as a convenient measuring device for receiving desired quantities of material from the dispensing opening.

The dispensing device of the present invention consists of an essentially flat body of carboard or the like which is secured flatwise on the surface of a wall of the container and having suitable guides formed therein for outlining a dispensing opening in the container. Such body may be secured in flatwise relation upon an imperforate surface of the container by the manufacturer thereof either before or after the same has been filled and thus will have no effect of weakening the container during the time that it is subjected to handling and shipping. When the consumer desires to make use of the dispensing device, a knife is inserted through the container wall following the outline provided by the guides or slits in the body. In a preferred form of the invention such action produces a generally V-shaped flap. Preferably the body is provided with a convenient form of tab or handle which may be grasped to open and close the flap. The double thickness of material afforded by the body and the severed portion of the container wall constitutes a flap of more than usual durability and stiffness and may be relied upon to operate satisfactorily throughout the normal period of time required for conventional use of the product.

Preferably, the device for defining the dispensing opening is positioned on one of the narrower walls of a rectangular carton and again preferably in a location closely adjacent to the bottom corner of the carton. Thus, particularly with containers of large size containing relatively heavy materials, the filled container may be laid on its front or rear wall on a shelf with the corner in which the dispensing opening is formed conveniently accessible for recurrent use. As the contents of the container become so depleted as not to flow readily from the dispener, the carton may be jarred or shifted to direct the contents thereof toward the corner in which the dispensing opening is positioned. After a major proportion of the contents have thus been withdrawn, the container and contents will be relatively light in weight and the handling thereof will not be difficult, in any event.

Several preferred, but not necessarily the only forms of the invention are illustrated in the accompanying drawings forming a part of this specification.

In the drawings:

Fig. 5 illustrates the manner in which a dispensing opening is formed in the package of Fig. 1;

Fig. 6 shows the device of the present invention in use;

Fig. 7 is a view similar to Fig. 4 but showing a modified form of dispensing device;

Fig. 8 is an elevational view of a package embodying the form of the invention shown in Fig. 7;

Fig. 9 is a section along the lines 9—9 of Fig. 8; and

Fig. 10 is a view similar to Fig. 8 but showing a dispensing device of still further modified form.

Figure 1:
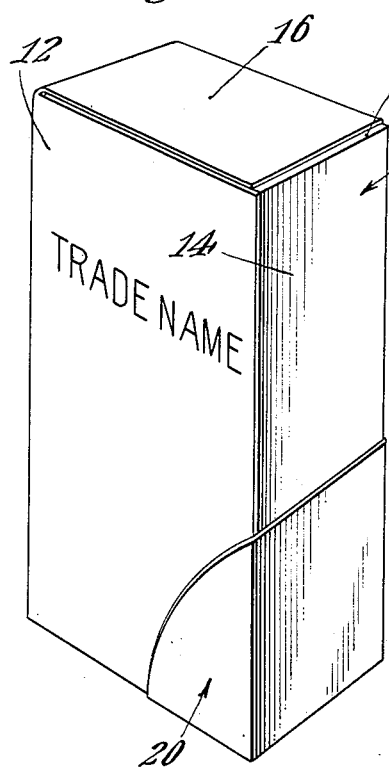
Fig. 1 is a perspective view of a package embodying the present invention.

Referring now to the drawings, in Fig. 1 there is shown a carton 10 of any suitable form. For purposes of illustration the carton 10 may comprise a rectangular box of cardboard, paperboard or the like, having a front wall 12, a corresponding rear wall (not shown) and relatively narrower side walls 14, only one of which is shown in Fig. 1. Any suitable form of top and bottom closures may be employed. For example, the carton 10 may be closed by the usual flaps 16 and 18 which form continuations respectively of the front and side walls. In Fig. 1 a measuring cup is shown in telescoped relation with the carton 10. The measuring cup is generally indicated at 20 and for practical purposes may be regarded as one corner section of a box having slightly larger dimensions than the box 10 so as to snugly telescope thereon. The measuring cup 20 may be made of cardboard or it may be molded from some inexpensive plastic material. If so desired, it may be secured in telescoped position upon the filled carton 10 by gummed tape or the like (not shown) in order to assure sale to the consumer of the complete package as shown in Fig. 1.

Figure 2:
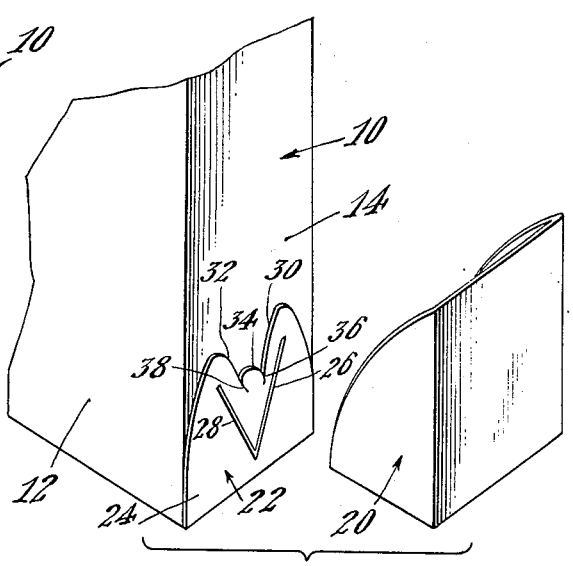
Fig. 2 is a fragmentary view similar to Fig. 1, showing the measuring cup removed from the package.
Figure 4:
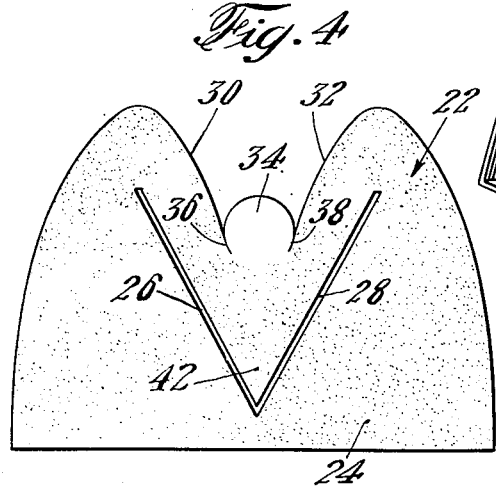
Fig. 4 is an enlarged plan view of the dispensing device forming a part of the package shown in Fig. 1.
Figure 3:
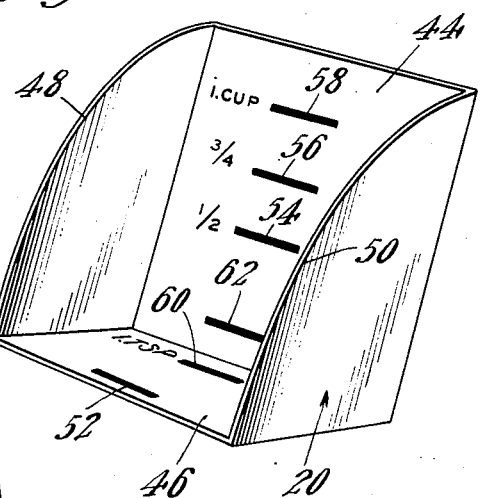
Fig. 3 is a perspective view showing suggested index marks inside the measuring cup.

In Fig. 2 the measuring cup 20 has been removed preparatory to obtaining access to the contents of the package by means of the dispensing device provided in accordance with the present invention. The dispensing device is indicated generally at 22 and in its simplest form may consist of a small sheet of cardboard or the like having a width substantially commensurate with the width of the side wall 14 and secured by means of adhesive to the surface of the side wall 14 adjacent the bottom corner of the box. As shown particularly in Fig. 4, the dispensing device 22 thus consists of a sheet of cardboard or the like 24 having formed therein intersecting slots 26 and 28 which are punched out of the cardboard sheet 24. The dispensing device 22 is provided with inwardly converging edges 30 and 32 which extend below the upper extremities of the slots 26 and 28. A tab 34 is positioned between the converging edges 30 and 32 and is cut free therefrom along curved slits 36 and 38 so that it may be bent freely along a horizontal line extending between the upper extremities of said slits 36 and 38. When the dispensing device is secured to the carton, as shown in Fig. 2, adhesive may be placed over the entire area thereof except for the tab 34 whereby, upon securing the same to the carton 10, the entire area of the dispensing device 32 except for the tab 34 will be tightly adhered to the surface of the side wall 14.

Referring now to Fig. 5, it will be observed that a knife 40 or other suitable instrumentality may be inserted into the slots 26 and 28 whereby to cut the underlying portion of the wall 14 to correspond with the slots 26 and 28. Thereafter the tab 34 may be grasped and bent downwardly for convenient access. Since the tab 34 is positioned below the upper extremities of the slots 26 and 28, it will be apparent that an outward pull exerted on the tab 34 will be effective to bend the V-shaped flap 42 composed of the laminated thicknesses of the dispensing device 22 and side wall 14 outwardly to expose a correspondingly V-shaped opening from which the contents of the package may flow. Open position of the dispensing device is illustrated in Fig. 6. The natural stiffness of the paperboard from which containers are customarily made and from which the dispensing device 22 may be made may be relied upon to tend to return the V-shaped flap 42 to original position after use. In any event, it may be readily pushed back into such position by the user. In some instances the user may find it convenient to force the flap slightly inside the container 10 where it will tend to stay much like a check valve.

The measuring cup 20, as pointed out above, may be made of paperboard similar to that used in the manufacture of the container 10 or it might be molded or otherwise formed from any suitable plastic or metallic material. It comprises a side wall 44 corresponding in width with the side wall 14 of the container 10 and a bottom wall 46 of similarly corresponding widths. End walls 48 and 50 extend between the side and bottom walls 44 and 46. The lateral spacing between the end walls 48 and 50 is such that they bear snugly against the front and rear walls of the container 10 when positioned as shown in Fig. 1. The end walls 48 and 50 may have any suitable shape and, as shown, are curved largely for the purpose of enhanced appearance. On the inner surfaces of the side and bottom walls 44 and 46, there may be printed or otherwise impressed so as to be visible, suitable index markings. For a product which may be used in quantities varying from one teaspoon to one or more cups, the measuring cup 20 may be provided with suggested indices herein illustrated. Thus the bottom wall 46 is provided with a common index mark 52 which may be used in conjunction with the index mark 54, 56 and 58 to indicated quantities of one-half cup, three-fourths cup and one full cup, respectively. Also, the bottom wall 46 and side wall 44 may be provided with relatively closely spaced index marks 60 and 62 for a relatively small quantity of material such as one teaspoon.

The measuring cup 20 may be used as indicated in Fig. 6 for receiving measured quantities of flowable material 63 from the container 10. After each use, if so desired, it may be replaced in telescoping position upon the container 10 where it will be available for the next use and also where it may supplement the V-shaped flap 42 to prevent any loss of material from the dispensing opening.

In Fig. 6 the container 10 is shown lying upon its back wall and resting on a shelf 64. Assuming that the container is a relatively large one holding perhaps 25 pounds of detergent or other material, it will be realized that the lifting of such container to pour some relatively small quantity of material therefrom is a difficult and awkward procedure. With the dispensing device of the present invention lifting of the container at any time when it contains a relatively large quantity of material may be substantially avoided. This is due to the fact that the dispensing device instead of being positioned in or adjacent the top, as is usual, is positioned in the lowermost corner of the side wall 14. Thus the container 10 may be so positioned as to extend slightly beyond the forward edge of the shelf 64 and left in that position for an extended period of time during which it may be used on frequent occasions. On each such occasion, the measuring cup 20 is removed from the corner containing the dispensing device and is positioned beneath the dispensing device to receive the contents which will flow therefrom when the V-shaped flap 42 is opened by means of the tab 34. The flow of contents 64 may be stopped by permitting the tongue 42 to spring shut or by assisting the same with slight finger pressure. As the contents fall below the general level of the dispensing opening it is only necessary to tilt the container upwards from the right hand end as viewed in Fig. 6 to bring more of the contents into the lower section thereof for flowing out of the dispenser device. When such operation is no longer effective to bring a sufficient quantity of material to the bottom of the container, the same will have been so reduced in weight that the lifting thereof for removal of the final portion of the contents will not be difficult.

The modification of the invention shown in Figs. 7, 8 and 9 consists of a sheet of cardboard or the like 66 having converging edges 68 and 70, continuations of which meet at a point 72. The cardboard body also includes a generally rectangular portion 74 which is integral with the triangular portion just described. The point 72 may be defined by score lines 76 and 78 formed in the cardboard. A sheet of paper or other suitable flexible material 80 has formed therein a pleat 82 and is secured as by adhesive to the outer surface of the triangular portion of the cardboard body 66. The pleat 82 serves as a tab or handle. As shown in Fig. 8, the cardboard body is secured to a carton 110 by adhesive which may cover the entire rear surface of the device as viewed in Fig. 7. When it is desired to form a dispensing opening in the carton 110 a knife is guided along the converging edges 68 and 70 from the top of the cardboard body 66 to the point 72. In this operation a V-shaped slit is formed in the container 110 and it will be understood that the triangular portion will be separated from the rectangular portion 74 by cutting along the lines of weakening 76 and 78. The dispensing flap will thus consist of a triangular portion of the container wall as well as the triangular portion of the cardboard body 66 and the paper in which the pleat or handle 82 is formed. Such unitary structure may be swung in and out for opening and closing the receptacle. The present form of the invention is particularly desirable inasmuch as the point 72 may be positioned substantially in coincidence with the bottom of the carton 110 and for this reason the flap will exhibit even greater tendency to remain closed after each use because of friction between the point 72 and the bottom of the carton.

In Fig. 10, a still further modification is shown wherein a generally V-shaped body 84 and generally rectangular portion 86 are formed integrally from cardboard as disclosed above in connection with Figs. 7 and 8. The portions 84 and 86 are provided with converging lines of weakening or score lines 88 and 90. The upper portion of the V-shaped body 84 may be cut away as indicated at 92 to define a tab 94 which is separated from the body 84 by slits 96, thus to be capable of bending along a horizontal line indicated at 98. When the device shown in Fig. 10 is applied to a carton 210, all of the rear surface thereof may be coated with adhesives except for the tab 94. When the consumer desires to make use of the dispensing device, a knife may be used to cut through the container wall along the edges 100 and 102 and the lines of weakening 88 and 90 to free the V-shaped flap as described above. The tab 94 may be used as a handle by bending the same forward into the position 94' illustrated in dotted lines in Fig. 10. The present form of the invention is similar to that shown in Figs. 7 through 9 in that the lowermost point 104 of the dispensing flap lies very close to the bottom of the container and actually may come into frictional contact therewith when the dispensing opening is temporarily closed by pushing it slightly inside the carton 210.

From the above detailed description of the preferred but not necessarily the only forms of the present invention, it will be apparent that there is provided a dispensing device applicable to containers of all sorts and particularly applicable to large containers for heavy, dense or valuable materials with which the ordinary forms of dispensing devices are impractical. Modifications and variations will occur to those skilled in the art without departing from the scope of this invention.

I claim:

1. In a container for flowable dry products the combination with a box made of paperboard and having a plurality of imperforate generally planar walls, of a device for facilitating the formation of a dispensing opening in one of said imperforate walls comprising a body of sheet material secured in flatwise relation upon the outer surface of said one imperforate wall, said body having means adapted to guide a cutting tool for insertion through said one imperforate wall, said guiding means comprising edges of said body which converge whereby upon cutting through said wall along said edges a substantially V-shaped dispensing opening with a corresponding reclosable flap is formed, and said flap comprising a ply of paperboard integral with said box having secured thereto a V-shaped portion of said body.

2. In a container for flowable dry products the combination with a rectangular box made of paperboard and having front, rear, side and top and bottom walls, all of said walls being imperforate and intersecting with adjacent walls at right angles, of a device for facilitating the formation of a dispensing opening in one of said walls comprising a body of sheet material secured in flatwise relation upon the outer surface of one of said imperforate walls adjacent the intersection of said one wall with an adjacent wall, said body having means adapted to guide a cutting tool for insertion through said one imperforate wall, said guiding means comprising two edges of said body which converge at a point in close proximity with the intersection of said one wall with an adjacent wall, whereby upon cutting through said wall along said edges a V-shaped dispensing opening with a corresponding reclosable flap is formed.

3. In a container for flowable dry products the combination with a box made of paperboard and having vertically intersecting front, rear, side and top and bottom walls, all of said walls being imperforate and said front and rear walls being substantially wider than said side walls, of a device for facilitating the formation of a dispensing opening in one of said side walls comprising a body of sheet material secured in flatwise relation upon the outer surface of said one side wall adjacent the intersection of said one side wall and said bottom wall, said body having means adapted to guide a cutting tool for insertion through said one side wall, said guiding means comprising two edges of said body which converge at a point in close proximity to the intersection of said one side wall with said bottom wall, whereby upon cutting through said one side wall along said edges a V-shaped dispensing opening with a corresponding reclosable flap is formed, and said dispensing opening being adapted when said flap is moved to open position to discharge contents from said box when said box is lying in a horizontal plane upon either said front or said rear wall.

4. A package for flowable dry products comprising a paperboard box filled with contents and having vertically intersecting front, rear, side and top and bottom walls, one of said side walls having adjacent the lower edge thereof means for defining a dispensing opening, and a measuring receptacle detachably positioned in telescoping relation with a corner of said box, said measuring receptacle having four walls adapted respectively to snugly overlie portions of the outer surfaces of the four walls of said box which form said corner, and one of the walls of said measuring receptacle being adapted to overlie said dispensing opening defining means when said measuring receptacle is positioned in telescoping relation over the corner of said box adjacent said means.

References Cited in the file of this patent
UNITED STATES PATENTS

| Number | Name | Date |
|---|---|---|
| 532,049 | Gillette et al. | Jan. 8, 1895 |
| 607,198 | Symonds | July 12, 1898 |
| 1,951,515 | Lyell | Mar. 20, 1934 |
| 2,009,779 | Kronquest | July 30, 1935 |
| 2,615,239 | Allen et al. | Oct. 28, 1952 |
| 2,630,251 | Edwards | Mar. 3, 1953 |